US009218805B2

(12) United States Patent  (10) Patent No.: US 9,218,805 B2
Elliott et al.  (45) Date of Patent: Dec. 22, 2015

(54) METHOD AND APPARATUS FOR INCOMING AUDIO PROCESSING

(71) Applicant: Ford Global Technologies, LLC, Dearborn, MI (US)

(72) Inventors: Doron M. Elliott, Detroit, MI (US); Ryan Robert Dauzet, Taylor, MI (US); Jeffrey Raymond Ostrowski, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 371 days.

(21) Appl. No.: 13/744,724

(22) Filed: Jan. 18, 2013

(65) Prior Publication Data

US 2014/0207465 A1  Jul. 24, 2014

(51) Int. Cl.
G10L 21/00 (2013.01)
G10L 15/00 (2013.01)

(52) U.S. Cl.
CPC ..................... *G10L 15/00* (2013.01)

(58) Field of Classification Search
CPC .......................................... G10L 15/30
See application file for complete search history.

(56) References Cited

U.S. PATENT DOCUMENTS

| | | | |
|---|---|---|---|
| 6,192,340 B1 * | 2/2001 | Abecassis ..................... 704/270 |
| 6,366,202 B1 | 4/2002 | Rosenthal | |
| 6,526,335 B1 | 2/2003 | Treyz et al. | |
| 6,573,833 B1 | 6/2003 | Rosenthal | |
| 7,047,117 B2 | 5/2006 | Akiyama et al. | |
| 7,207,041 B2 | 4/2007 | Elson et al. | |
| 7,266,435 B2 | 9/2007 | Wang et al. | |
| 7,505,784 B2 | 3/2009 | Barbera | |
| 7,602,782 B2 | 10/2009 | Doviak et al. | |
| 7,681,201 B2 * | 3/2010 | Dale et al. ..................... 719/313 |
| 7,801,941 B2 | 9/2010 | Conneely et al. | |
| 7,904,300 B2 * | 3/2011 | Abbott et al. ................. 704/275 |
| 8,121,802 B2 | 2/2012 | Grider et al. | |
| 8,131,458 B1 | 3/2012 | Zilka | |
| 8,725,063 B2 * | 5/2014 | Krampf et al. ............... 455/3.05 |
| 8,892,465 B2 * | 11/2014 | Mikkelsen et al. .......... 705/27.1 |
| 2002/0098853 A1 | 7/2002 | Chrumka | |
| 2003/0079123 A1 | 4/2003 | Mas Ribes | |
| 2003/0147534 A1 | 8/2003 | Ablay et al. | |
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0091408 A1 | 4/2005 | Parupudi et al. | |
| 2005/0177635 A1 | 8/2005 | Schmidt et al. | |

(Continued)

OTHER PUBLICATIONS

European Patent Office.

(Continued)

*Primary Examiner* — Brian Albertalli
(74) *Attorney, Agent, or Firm* — Jennifer M. Stec; Brooks Kushman P.C.

(57) ABSTRACT

A system includes a processor configured to receive a verbal request to active an audio playback application on a remote device wirelessly connected to the processor. The processor is also configured to relay the request to the remote device for handling. The processor is further configured to receive a request from the remote device for audio playback. The processor is also configured to select a source channel for incoming audio. The processor is additionally configured to receive incoming audio from the remote device over the selected source channel and playback the incoming audio over a vehicle output.

17 Claims, 3 Drawing Sheets

(56) References Cited

U.S. PATENT DOCUMENTS

| | | |
|---|---|---|
| 2005/0209852 A1* | 9/2005 | Beckert et al. ............... 704/246 |
| 2006/0150197 A1 | 7/2006 | Werner |
| 2006/0156315 A1 | 7/2006 | Wood et al. |
| 2006/0190097 A1* | 8/2006 | Rubenstein ..................... 700/17 |
| 2006/0287787 A1 | 12/2006 | Engstrom et al. |
| 2006/0287821 A1 | 12/2006 | Lin |
| 2007/0016362 A1 | 1/2007 | Nelson |
| 2007/0042809 A1 | 2/2007 | Angelhag |
| 2007/0042812 A1 | 2/2007 | Basir |
| 2007/0050854 A1 | 3/2007 | Cooperstein et al. |
| 2007/0132572 A1 | 6/2007 | Itoh et al. |
| 2007/0140187 A1* | 6/2007 | Rokusek et al. ............. 370/338 |
| 2007/0294625 A1 | 12/2007 | Rasin et al. |
| 2008/0032663 A1* | 2/2008 | Doyle ........................... 455/345 |
| 2008/0086455 A1 | 4/2008 | Meisels et al. |
| 2008/0147308 A1* | 6/2008 | Howard et al. ............... 701/200 |
| 2008/0148374 A1 | 6/2008 | Spaur et al. |
| 2008/0162147 A1* | 7/2008 | Bauer ........................... 704/275 |
| 2008/0220718 A1 | 9/2008 | Sakamoto et al. |
| 2008/0313050 A1 | 12/2008 | Basir |
| 2009/0010448 A1 | 1/2009 | Voto et al. |
| 2009/0075624 A1 | 3/2009 | Cox et al. |
| 2009/0076821 A1* | 3/2009 | Brenner et al. ............... 704/260 |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0156182 A1 | 6/2009 | Jenkins et al. |
| 2009/0228908 A1 | 9/2009 | Margis et al. |
| 2009/0253466 A1 | 10/2009 | Saito et al. |
| 2009/0318119 A1 | 12/2009 | Basir |
| 2010/0049528 A1* | 2/2010 | Zeinstra et al. ............... 704/275 |
| 2010/0063670 A1 | 3/2010 | Brzezinski et al. |
| 2010/0094996 A1 | 4/2010 | Samaha |
| 2010/0097239 A1* | 4/2010 | Campbell et al. ......... 340/825.25 |
| 2010/0098853 A1 | 4/2010 | Hoffmann et al. |
| 2010/0120366 A1* | 5/2010 | DeBiasio et al. ............. 455/41.3 |
| 2010/0157061 A1 | 6/2010 | Katsman et al. |
| 2010/0216509 A1 | 8/2010 | Riemer et al. |
| 2010/0234071 A1 | 9/2010 | Shabtay et al. |
| 2010/0235744 A1* | 9/2010 | Schultz et al. ................ 715/717 |
| 2010/0306309 A1 | 12/2010 | Santori et al. |
| 2011/0087385 A1 | 4/2011 | Bowden et al. |
| 2011/0105097 A1 | 5/2011 | Tadayon et al. |
| 2011/0110530 A1 | 5/2011 | Kimura |
| 2011/0112762 A1 | 5/2011 | Gruijters et al. |
| 2011/0185390 A1 | 7/2011 | Faenger et al. |
| 2011/0195659 A1 | 8/2011 | Boll et al. |
| 2011/0275358 A1 | 11/2011 | Faenger |
| 2011/0296037 A1 | 12/2011 | Westra et al. |
| 2012/0052909 A1* | 3/2012 | Joh et al. ....................... 455/557 |
| 2012/0054300 A1 | 3/2012 | Marchwicki et al. |
| 2012/0064917 A1 | 3/2012 | Jenkins et al. |
| 2012/0065815 A1 | 3/2012 | Hess |
| 2012/0079002 A1 | 3/2012 | Boll et al. |
| 2012/0084299 A1 | 4/2012 | Liang et al. |
| 2014/0188483 A1* | 7/2014 | Hisada .......................... 704/275 |

OTHER PUBLICATIONS

International Search Report for the corresponding PCT/US2010/37052.
Korean Intellectual.
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
Service Discovery Protocol (SDP) Layer Tutorial, Palowireless Bluetooth Research Center, http://www.palowireless.com/infotooth/tutorial/sdp.asp. Aug. 3, 2010.
Iphone Hacks, Apple Files Patent Which Allow You to Control Your Computer Remotely Using Iphone, http://www.iphonehacks.com/2009/12/apple-files-patent-which-could-allow-you-to-control-your-computer-remotely-using-iphone, Jun. 22, 2010.
Zack Newmark, American, Concept Car, Ford, Gadgets, Lifestyle, Technology, Student develop in-car cloud computing apps; envision the future of in-car connectivity, May 4, 2010, http://ww.woldcarfans.com/print/110050425986/student-develop-in-car-cloud-computing_apps;_envision_the_future_of_in-car_connectivity.
Wikipedia, the free encyclopedia, X Window System, http://en.wikipedia.org/wiki/X_Window_System, Jun. 22, 2010.
Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.
"MobileSafer is your personal safe driving assistant", 2010 ZoomSafer Inc. <http://zoomsafer.com/products/mobilesafer> Dec. 28, 2010.
"How PhonEnforcer Works" Turn Off the Cellphone While Driving—PhonEnforcer. Turn Off the Cell Phone LLC. <http://turnoffthecellphone.com/howitworks.htm> Dec. 28, 2010, pp. 1-3.
"PhonEnforcer FAQ's" Turn Off the Cellphone While Driving—PhonEnforcer. Turn Off the Cell Phone LLC. <http://turnoffthecellphone.com/faq.html> Dec. 28, 2010, pp. 1-2.
Lamberti, Ralph "Daimler Full Circle: The Rise of Vehicle-Installed Telematics—Telematics Munich 2009" Nov. 10, 2009.v.
Narasimhan, et al., A lightweight remote display management protocol for mobile devices, Application Research Center, Motorola Labs Schaumburg, IL, 2007, pp. 711-715.
Voelcker, Top 10 Tech Cars It's the Environment, Stupid, www.SPECTRUM.IEEE.ORG, Apr. 2008, pp. 26-35.
Yarden, et al., Tuki: A Voice-Activated Information Browser, IEEE, 2009, pp. 1-5.
Gil-Castineira, et al., Integration of Nomadic Devices with Automotive User Interfaces, IEEE Transactions on Consumer Electronics, vol. 55, No. 1, Feb. 2009.
Nusser, et al., Bluetooth-based Wireless Connectivity in an Automotive Environment, Robert Bosch GmbH, VTC 2000, pp. 1935-1942.
Antuan Goodwin, The Car Tech Blog, Ford Unveils open-source Sync developer platform, http://reviews.cnet.com/8301-13746_7-10385619-48.html, Oct. 2009, pp. 1-5.

* cited by examiner

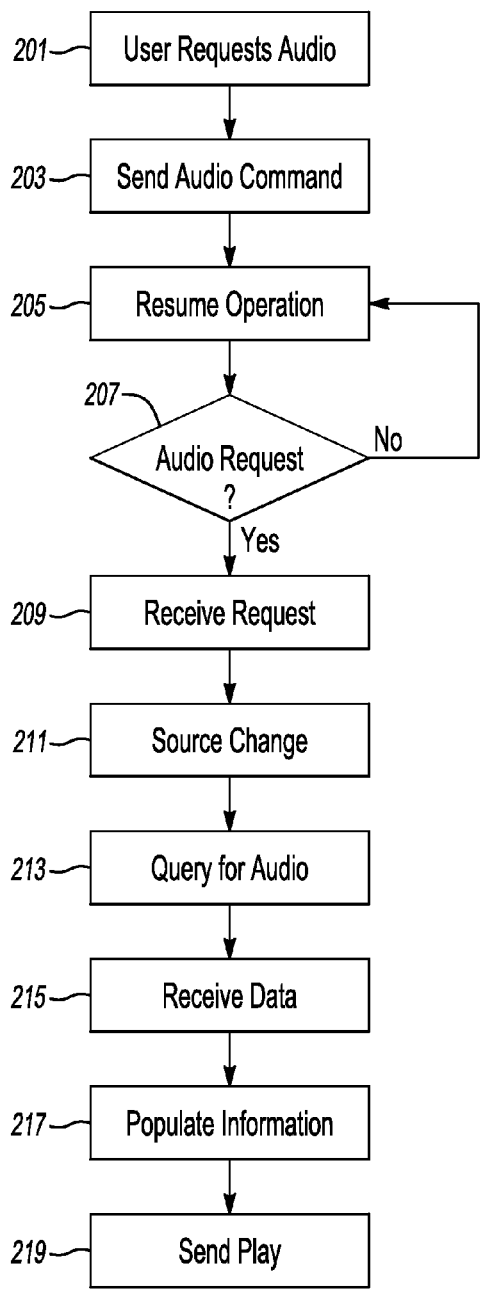
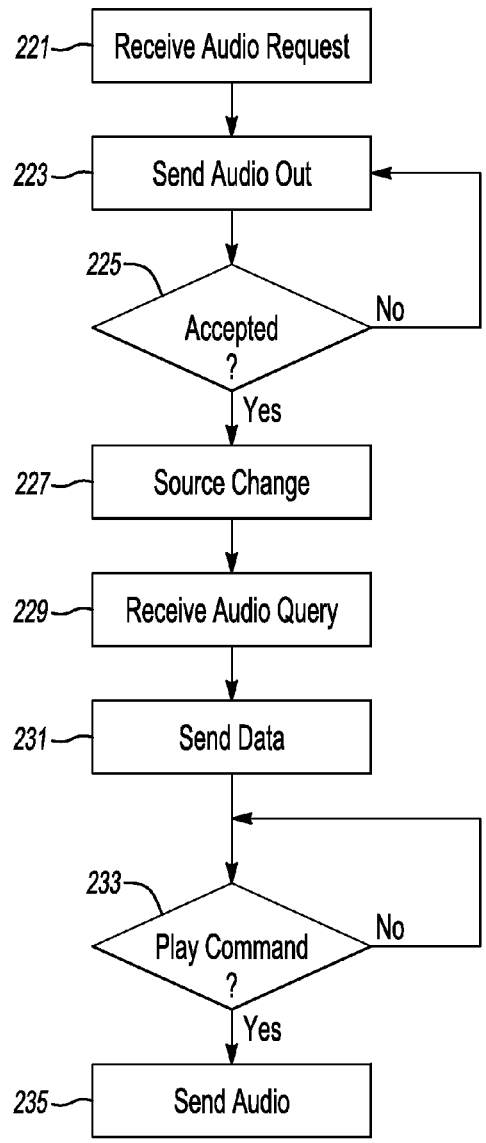
Fig-2A
Fig-2B

US 9,218,805 B2

METHOD AND APPARATUS FOR INCOMING AUDIO PROCESSING

TECHNICAL FIELD

The illustrative embodiments generally relate to a method and apparatus for incoming audio processing.

BACKGROUND

Use of voice-input technology has provided for a much safer driver experience. Using voice, a driver can instruct radio changes, CD playback or even selection of an external source. In some cases, the driver may wish to control the external source using verbal commands. Because the vehicle may act as a mere passthrough in these cases, the vehicle does not necessarily comprehend the nature of the passed through command. Accordingly, the vehicle may not know, for example, that incoming audio from an audio playback command will be present.

U.S. 2011/0110530 generally relates to an in-vehicle audio device and an in-vehicle audio system are disclosed. The in-vehicle audio device acquires and registers metadata of music data from multiple music possession devices, at least one of which is a portable music carrier device capable of performing wireless communication. Regarding the metadata acquired from the portable music carrier device, the in-vehicle audio device maintains the registration of the metadata after a communication connection between the portable music carrier device and the in-vehicle audio device is cut off. The in-vehicle audio device creates a playlist based on the registered metadata.

U.S. Pat. No. 7,047,117 generally relates to an integrated vehicle control system includes various functionalized networks, such as power train group, vehicle motion group, and power source group, each including a plurality of ECUs connected via an individual communication line. A managing ECU in each network determines operation directives to be supplied to individual ECUs belonging to its own network based on information obtained from these individual ECUs as well as information obtained from other ECUs of different networks via a host communication line L4. The determined operation directives are transmitted to corresponding ECUs to cause respective individual ECUs to operate subordinately according to the given operation directives, thereby realizing a collective control of specific functions. The managing ECU also executes abnormality detection processing for detecting abnormality occurring in the integrated vehicle control system.

SUMMARY

In a first illustrative embodiment, a system includes a processor configured to receive a verbal request to active an audio playback application on a remote device wirelessly connected to the processor. The processor is also configured to relay the request to the remote device for handling. The processor is further configured to receive a request from the remote device for audio playback. The processor is also configured to select a source channel for incoming audio. The processor is additionally configured to receive incoming audio from the remote device over the selected source channel and playback the incoming audio over a vehicle output.

In a second illustrative embodiment, a computer-implemented method includes receiving a verbal request to active an audio playback application on a remote device wirelessly connected to the processor. The method also includes relaying the request to the remote device for handling. The method further includes receiving a request from the remote device for audio playback. The method additionally includes selecting a source channel for incoming audio. The method also includes receiving incoming audio from the remote device over the selected source channel and playing back the incoming audio over a vehicle output.

In a third illustrative embodiment, a non-transitory computer-readable storage medium storing instructions that, when executed by a processor, cause the processor to perform the method including receiving a verbal request to active an audio playback application on a remote device wirelessly connected to the processor. The method also includes relaying the request to the remote device for handling. The method further includes receiving a request from the remote device for audio playback. The method additionally includes selecting a source channel for incoming audio. The method also includes receiving incoming audio from the remote device over the selected source channel and playing back the incoming audio over a vehicle output.

BRIEF DESCRIPTION OF THE DRAWINGS

FIG. 2A shows an illustrative example of an audio switching process;

FIG. 2B shows another illustrative example of an audio switching process;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
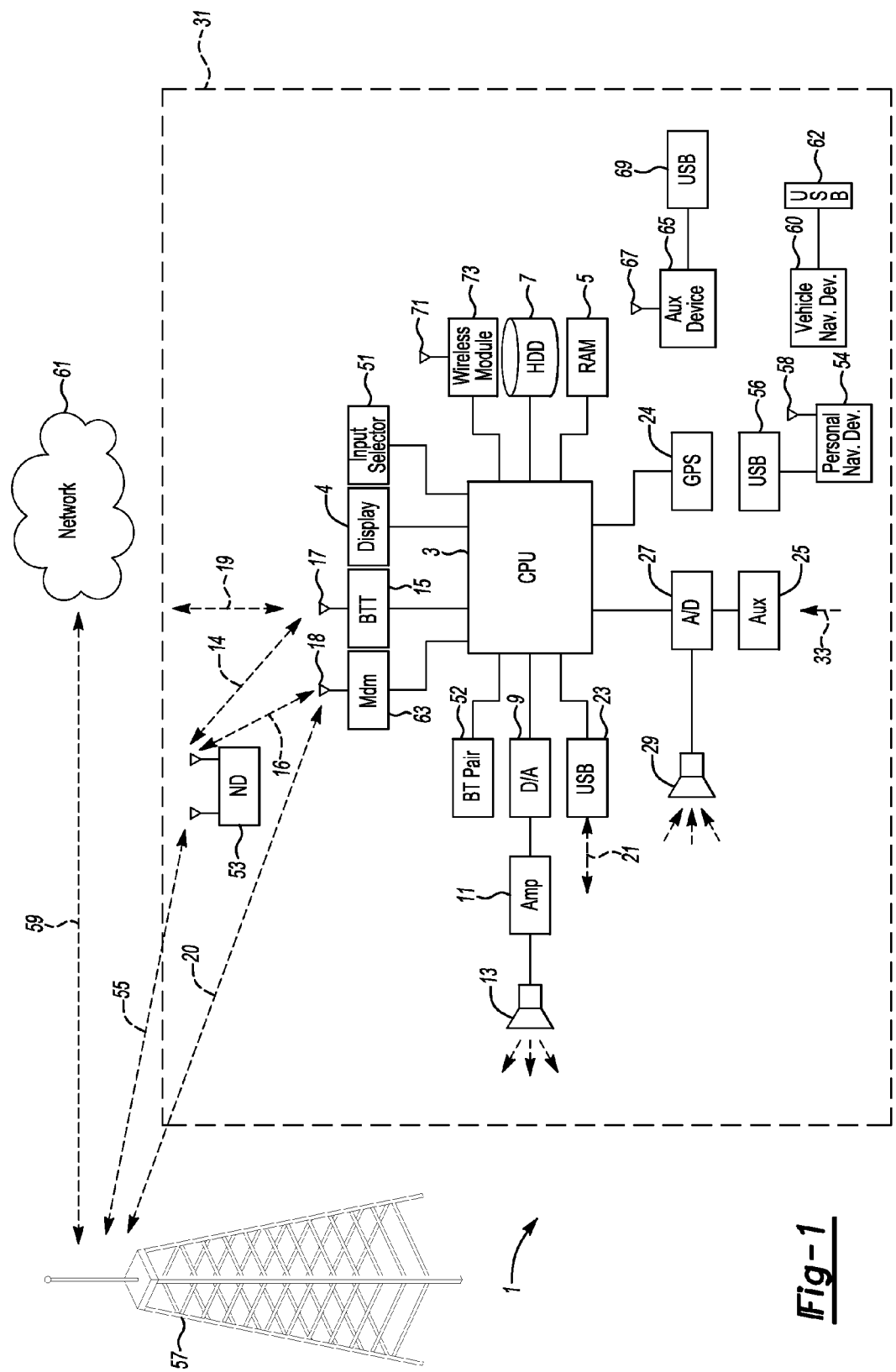
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Integration of computing systems with vehicles for entertainment provision has resulted in a variety of user-available functionality. Wireless connectivity with portable audio devices, such as smart phones, allows users to play back audio on a vehicle entertainment system. These devices, through use of wireless connectivity solutions, such as, but not limited to, BLUETOOTH, can be controlled from a vehicle computing system through manually or verbally input commands.

While control of devices through, for example, verbal commands, is convenient, it can lead to some difficulties on the vehicle-side. In some instances, if audio playback is initiated through a verbal command on the wireless device, the vehicle itself may have no way of knowing that an audio output was requested by the device. This could be, for example, because the command itself is merely relayed through the vehicle computing system, and not "understood" by the system.

If the user were to interact with the device to play audio, the user may manually change a source to that of the device to indicate to the vehicle computing system (also called the infotainment system) that audio output is incoming. If the user verbally commands the audio to begin, however, the user may not remember to change the source. This could result in a failure to initially change the source when playback begins.

To address this possible shortcoming, it is possible to set up a "dialogue" between the remote device and the vehicle computing system to ensure that the proper source for audio input is chosen. The illustrative examples discussed herein show some possible methodologies through which this can be accomplished. These examples are illustrative in nature and are not intended to limit the scope of the invention thereto.

FIG. 2A shows an illustrative example of an audio switching process. In this illustrative example, the process is shown from the vehicle side. The user is capable of controlling a wireless device through verbal interaction with the vehicle computing system. In this example, the commands are relayed from an audio input, such as a vehicle microphone, to a remote device for application activation. So, for example, the user may request playback of audio 201 on a wireless device, and the command will be relayed to the wireless device to activate a requested application or playback function 203.

In this example, while the vehicle sends the command to the wireless device, the vehicle doesn't necessarily "know" that audio input is forthcoming. It is possible that the vehicle interprets the command first and has some knowledge of the incoming audio, but if this process does not occur, the vehicle may need some indication that an audio stream is incoming. Further, an audio source may need to be selected.

In this illustrative example, after the audio command has been relayed to the device, the vehicle computing system may resume/continue any other operation in which it had previously been engaged 205. Since the system doesn't know that an audio stream is incoming, it does not necessarily enter a state in which it is waiting for an audio request. If, however, an audio request is incoming 207, the system may engage in a further portion of the process to select an appropriate audio source to allow playback.

It may be the case where there is an additional command that may be sent from the wireless device in order to provide the notification to the vehicle computing system of incoming audio. The command could be included in an application running on the device, either the audio application or a secondary application provided for the purpose of interfacing with the vehicle computing system and acting as an intermediary between the requested media application and the vehicle computing system.

In this illustrative example, the vehicle computing system receives the requested audio playback command 209. Receipt of the command can result in a source change within the vehicle computing system 211 through a source change function. The source change function, if performed by the vehicle, is discussed in greater detail in FIG. 3A. Once the appropriate source change has occurred, the vehicle computing system can receive data relating to the incoming audio.

Since the vehicle now knows that audio is incoming, it may query the device for information relating to the incoming audio 213. For example, track data, lengths, song names, artist information, etc. can be requested from the device. Other suitable metadata may also be requested for display on or use by the vehicle computing system. Following the query, the requested data may be received by the vehicle computing system 215.

Any information that should be presented via a display on the vehicle computing system may then be populated 217. This can include displays of, for example, song names, artist/album names, song length, etc. Once this information has been populated, in this example, the process sends a play command to the device 219. In this example, the play command is not sent until the rest of the processes are complete, although suitable changes to the process could be made as desired. In this example, the process attempts to ensure that the audio playback doesn't begin until an appropriate source is selected. In another instance, the play command could come from the device itself, notifying the system that playback is beginning.

FIG. 2B shows another illustrative example of an audio switching process. In this illustrative example, the process is illustrated from a device side perspective. The device receives the audio request from the vehicle computing system 221. Since the vehicle computing system may need to receive notification that audio output will be initiated, the device may send a signal to the vehicle computer that audio will be output from the device 223.

Also, in this illustrative example, the device may wait to proceed with further processing until the audio out notification has been received an accepted by the vehicle computer, so as to avoid inadvertent playback of media before a source change has been made. Once the vehicle computing system has accepted the audio out command 225, or otherwise acknowledged the command, a source change may occur 227. In this example, the device changes the source, or at least instructs the source change, and this is discussed in greater detail with respect to FIG. 3B.

Once the appropriate source change has been instructed and performed, the device may then receive a media metadata query from the vehicle computing system 229. The vehicle computing system may request a variety of data, including, but not limited to, track data, lengths, song names, artist information, etc. Any available data that is requested may be sent back to the vehicle 231 for appropriate output.

As with the example in FIG. 2A, in this example the device waits to begin playing audio until the vehicle is ready. Accordingly, the process illustrated here waits until a media play command is received 233. This helps to ensure that media playback does not begin until the system is ready to receive the audio. Once the play command has been received from the vehicle computing system, the process begins to send the media stream 235.

Figure 3A:
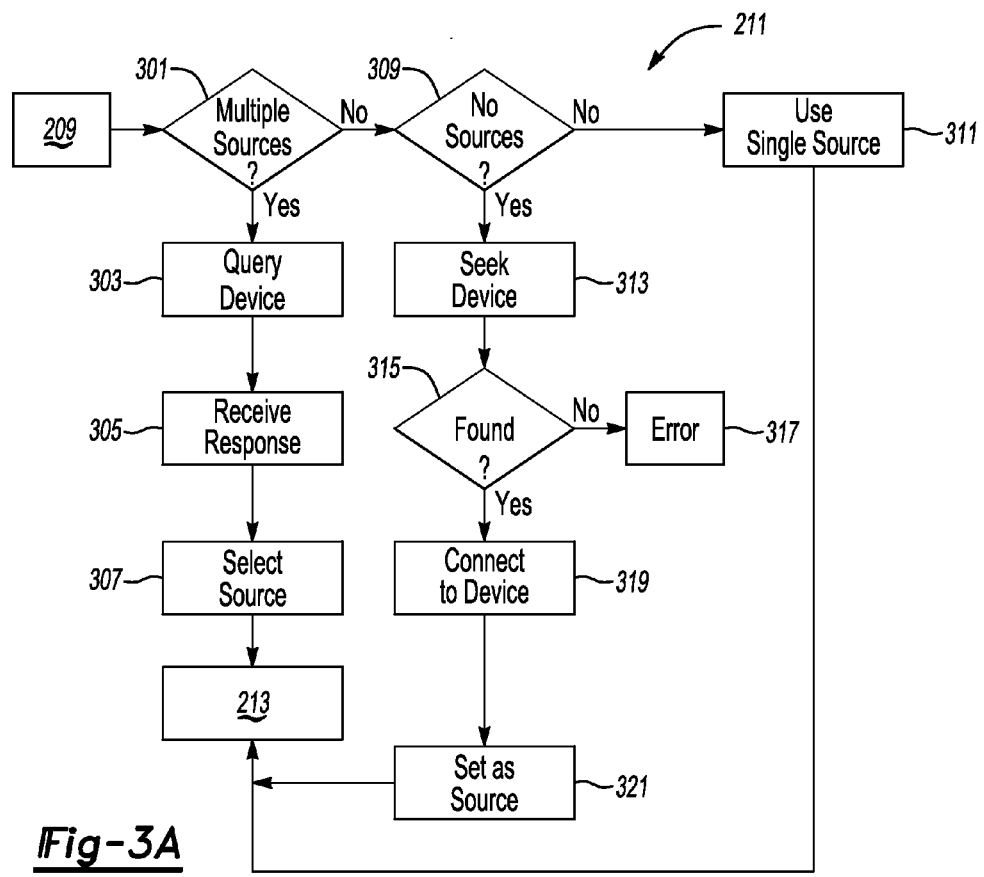
FIG. 3A shows an illustrative example of a source selection process.

FIG. 3A shows an illustrative example of a source selection process. In this illustrative example the process is shown from a vehicle-side perspective. Since there may be multiple possible audio sources connected (USB, BLUETOOTH, etc.) or there may be no discernable audio sources connected, it may be desirable to have the vehicle computing system select an audio source once an incoming audio stream is indicated.

In this illustrative process, the vehicle computing system has received an indication that an audio stream will be output from the remote device. In this process, the system determines if there are multiple audio sources connected 301. If multiple sources are connected, the system may query the wireless device for an audio source 303 indication. Additionally or alternatively, the device may have sent some indicia as to over which audio source the playback would be delivered. Or, in another embodiment, the system may determine what sort of connection is currently established with the device, and utilize this connection to determine an appropriate audio source.

Once the audio query has been initiated, the process may receive a response to the query from the device 305, indicating a desired audio source for playback. Audio, as used herein, is exemplary of one sort of media that could be delivered, but it is to be understood that any media delivered from a connected device could be activated/enable utilizing the principles hereof.

Once the device has indicated a desired audio channel, the vehicle computing system may switch to the appropriate audio channel and proceed with the remaining audio inception process 213.

In another instance, there may be no audio sources connected 309. This could be because a suitable audio source connection has not yet been established with the device. In such an instance, the process could seek out the device 313 over an appropriate audio channel/connection. If no suitable connection could be found 315, the process could report an error to the user 317. For example, if no BLUETOOTH connection was available, the process could report to the user that BLUETOOTH devices cannot be found, and the user may have to enable BLUETOOTH on the device.

If the device is found 315 on the appropriate channel (or on any channel, if the vehicle system searches over a variety of wireless connection options), the process may proceed with connecting to the wireless device 319. Once a connection has been established, the vehicle system can then select that connection as the input for the audio sent from the device 321.

In a third alternative possibility, if there are not multiple sources connected, and there are not zero sources connected, there must be a single source connected. In this case, the process selects the only source as the appropriate source for the audio playback 311.

Figure 3B:
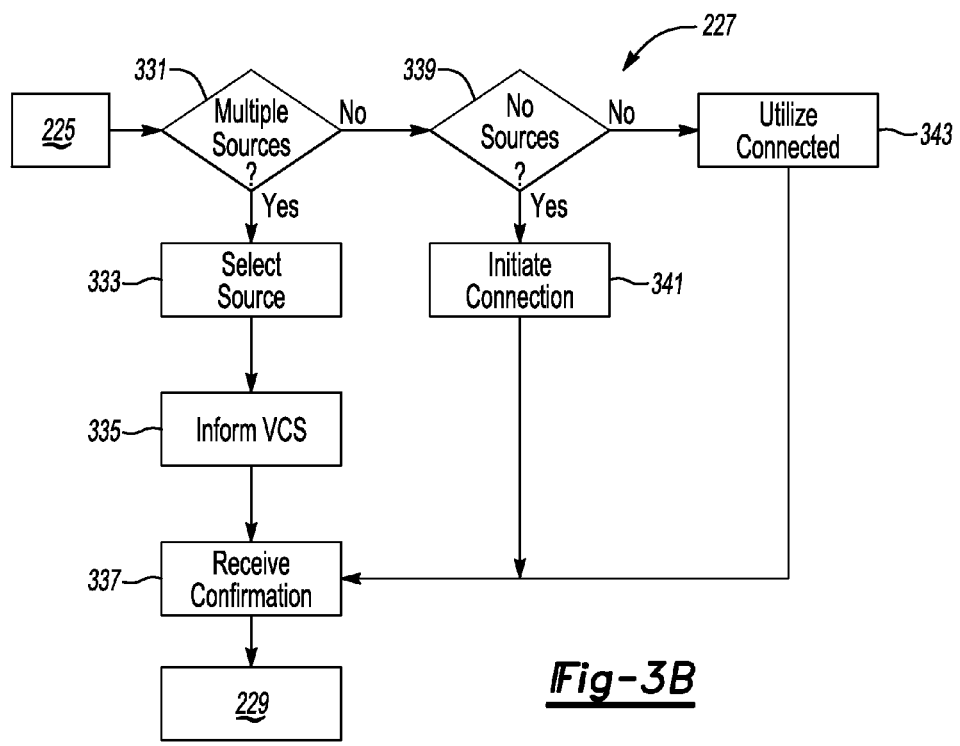
FIG. 3B shows another illustrative example of a source selection process.

FIG. 3B shows another illustrative example of a source selection process. In this illustrative example, the process is shown from a device-side perspective. In this example, the process has been notified that a vehicle computing system has responded to a request for initiation of an audio connection. In this example, the selection of an audio source is done by the device as opposed to the vehicle computing system. The device may perform the connectivity requests, or may notify the vehicle computing system of a particular desired connection.

In this illustrative example, the process checks to determine if multiple sources are connected to the vehicle computing system 331. This may require a query to the vehicle computing system to determine if multiple sources exist. Since the device presumably knows which source it intends to utilize, it can then select that source 333 from among the multiple sources connected.

The device then informs the vehicle computing system of the desired audio source 335. Once the vehicle computing system has received the notification, it may respond to the device so that the process knows that the desired connection has been selected. The process, upon receiving the confirmation 337, can then proceed with the remaining steps of audio/media playback 229.

In another instance, there may be zero sources connected 339. In such an instance, the process may then attempt to initiate a connection with the vehicle computing system over the desired source 341. Once a connection has been established, the process may receive a confirmation that the connection was established so that the source can be utilized.

In a third instance, the sole connection that exists may be utilized 343.

Through application of the illustrative embodiments, voice-activated remote device applications desiring media playback can be used in the vehicle with seamless interaction. Once the media playback is verbally requested, the processes illustrated herein serve (in an exemplary manner) to complete the initialization of the media connectivity so that media playback may be realized.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a verbal request to activate an audio playback application on a wirelessly connected remote device;
relay the request to the remote device for handling;
receive a request from the remote device for audio playback, including a preferred audio source channel;
enable the preferred audio source channel for incoming audio;
receive incoming audio over the enabled source channel; and
playback the incoming audio over a vehicle output.

2. The system of claim 1, wherein the source channel is determined by the processor.

3. The system of claim 1, wherein the request is sent to the remote device in the form in which it was received.

4. The system of claim 1, wherein the processor is further configured to receive metadata relating to the audio playback.

5. The system of claim 1, wherein the processor is further configured to populate a vehicle display with the relevant metadata.

6. The system of claim 1, wherein the processor is further configured to send a play command prior to receiving audio, but following source selection, such that incoming audio is not present until the play command is sent.

7. A computer-implemented method comprising:
receiving a verbal request at a vehicle computer to activate an audio playback application on a wirelessly connected remote device;
relaying the request to the remote device for handling;

receiving a request from the remote device for audio playback;

querying the remote device for a preferred audio source channel, based on a plurality of audio-providing devices being presently connected to a plurality of source channels;

selecting a source channel for incoming audio based on a response to the query;

receiving incoming audio from the remote device over the selected source channel; and playing back the incoming audio over a vehicle output.

8. The method of claim 7, wherein the source channel is determined by the vehicle computer.

9. The method of claim 7, wherein the request is sent to the remote device in the form in which it was received.

10. The method of claim 7, further comprising receiving metadata relating to the audio playback.

11. The method of claim 10, further comprising populating a vehicle display with the relevant metadata.

12. The method of claim 7, further comprising sending a play command prior to receiving audio, but following source selection, such that incoming audio is not present until the play command is sent.

13. A non-transitory computer-readable storage medium storing instructions that, when executed by a processor, cause the processor to perform the method comprising:

receiving a verbal request to activate an audio playback application on a wirelessly connected remote device;

relaying the request to the remote device for handling;

receiving a request from the remote device for audio playback, including a preferred audio source channel;

enable the preferred audio source channel for incoming audio;

receiving incoming audio over the enabled source channel; and playing back the incoming audio over a vehicle output.

14. The storage medium of claim 13, wherein the source channel is determined by the processor.

15. The storage medium of claim 13, wherein the request is sent to the remote device in the form in which it was received.

16. The storage medium of claim 13, the method further comprising receiving metadata relating to the audio playback.

17. The storage medium of claim 13, the method further comprising sending a play command prior to receiving audio, but following source selection, such that incoming audio is not present until the play command is sent.

* * * * *